United States Patent
Young et al.

(10) Patent No.: US 9,493,296 B1
(45) Date of Patent: Nov. 15, 2016

(54) SHIPPING STRAP ASSEMBLY FOR A VIBRATORY SCREENING MACHINE

(71) Applicants: Grant A. Young, Tulsa, OK (US); Thomas Ray Young, Jenks, OK (US)

(72) Inventors: Grant A. Young, Tulsa, OK (US); Thomas Ray Young, Jenks, OK (US)

(*) Notice: Subject to any disclaimer, the term of this patent is extended or adjusted under 35 U.S.C. 154(b) by 0 days.

(21) Appl. No.: 14/728,736

(22) Filed: Jun. 2, 2015

(51) Int. Cl.
*F16M 13/00* (2006.01)
*B65D 85/68* (2006.01)
*B65D 67/02* (2006.01)
*F16B 1/00* (2006.01)

(52) U.S. Cl.
CPC ............... *B65D 85/68* (2013.01); *B65D 67/02* (2013.01); *F16B 1/00* (2013.01); *B65D 2585/6897* (2013.01)

(58) Field of Classification Search
CPC ........... F16M 5/02; Y02T 403/62; F16D 1/00; B65D 85/68; B65D 67/02
See application file for complete search history.

(56) References Cited

U.S. PATENT DOCUMENTS

| 1,755,264 A | * | 4/1930 | Mirzan | ................. F16B 13/066 |
| | | | | 411/60.2 |
| 2012/0237289 A1 | * | 9/2012 | Guerin | ..................... F16B 5/02 |
| | | | | 403/332 |

* cited by examiner

*Primary Examiner* — Amy Sterling (57) ABSTRACT

A shipping strap assembly protects the isolator mechanism of a vibratory screening machine against exceeding its elastic limits. The isolator mechanism is pivotally connected between shafts on the machine frame and the machine basket. The protective assembly includes a distally narrowing boss on at least one of the shafts. A rigid strap has two apertures, one contoured to receive and ride on the boss and the other contoured to receive the other shaft, spaced to maintain the distance between the shaft axes within an elastic limit of the isolator mechanism. The narrowing boss provides leeway for easy manual alignment of the mechanism shafts with the strap apertures, and the narrowing boss and contour of the other aperture facilitate restoration toward its normal load length, of an elastically distorted mechanism.

11 Claims, 7 Drawing Sheets

SHIPPING STRAP ASSEMBLY FOR A VIBRATORY SCREENING MACHINE

BACKGROUND OF THE INVENTION

This invention relates generally to vibratory screening machines and more particularly concerns shipping straps used to protect the isolator mechanisms of a vibratory screening machine during transport of the machine from site to site.

Known isolator mechanisms include one or more coil springs or other types of resiliently expanding and contracting components, such as rubber-based belts, in lieu of the springs. The springs are commonly positioned at or near each of the four corners of the machine and suspend or support the basket of the machine from or on the machine base frame. Thus, the isolator mechanisms serve as pivoting linkages between the basket and frame. A typical known isolator mechanism is hereinafter described in detail.

Whatever the type of vibratory screening machine involved, its isolator mechanism and mass configuration will have a low resonance frequency. Unless the basket is locked down, the force fluctuations encountered during machine transport are close to its resonance point. These fluctuations often cause the basket to be displaced from the base frame to such an extent that the isolator mechanism will permanently stretch, the isolator mechanism "spring rate" may change, the basket may hang unevenly and, ultimately, the isolator mechanism will fail as its elastic limit is exceeded. As these deficiencies progress, the result will be increasing machine inefficiency and possibly total inoperability of the machine. The replacement of a defective isolator mechanism, assuming a replacement is on-hand, will typically require a half day of machine/drilling rig down time at a loss rate of likely more than $8,000 per day.

The known solution to these problems requires the use of a rigid shipping strap to "lock down" the isolator mechanism. A typical known shipping strap is hereinafter described in detail. The strap prevents any expansion or compression of the springs or equivalents during transport. This solution introduces problems of its own.

Prior to transport, if the springs are stretched beyond their normal load length, levers must be used to raise or lower the basket level to bring the springs to their normal load length so that the rigid strap can be aligned with the isolator mechanism. Once the springs are at their normal load length, the rigid strap can be installed on the isolator mechanism, but a separate tool is required to secure the strap and lock the mechanism down. In the locked-down status, the springs cannot expand at all and remain at their normal load length throughout transport. However, at the delivery site, a tool is again required to remove the strap from the mechanism.

Because of the owner's desire to achieve maximum the use of an expensive screening machine, there is generally a sense of urgency felt by rig hands to speed up the installation and removal of the machine from site to site. Rig downs are normally hectic and the tasks of installing and removing shipping straps are generally considered by rig hands to be a nuisance. Many rig hands simply do not want to take the time to perform the necessary tasks, especially when levering the basket into alignment with the straps is one of the necessary strap installation steps. If straps are not installed, they don't have to be removed. Since the tasks require separate tools and parts, for example a wrench and nuts, if the tools or parts are "lost" or "misplaced," the shipping straps cannot be installed or removed and the shipping strap nuisance is thus avoided. But, eventually, when machines are moved without shipping straps, isolator mechanisms are stretched, shaker performance is poor and, ultimately, the isolator mechanisms fail totally and the machines will be inoperable until they are replaced.

It is, therefore, an object of this invention to provide a shipping strap assembly which eliminates the need of levers to bring isolator mechanisms to their normal loaded length before installation of the shipping strap. It is a further object of this invention to provide a shipping strap assembly which eliminates the need for tools to install or remove the shipping strap on or from an isolator mechanism. It is another object of this invention to provide a shipping strap assembly which eliminates the necessity for putting a machine basket in a locked-down condition for transport. Still another object of this invention is to provide a shipping strap assembly which eliminates the need for ever removing a shipping strap or installation part from the machine. It is also an object of this invention to provide a shipping strap assembly which reduces and simplifies the tasks involved in protecting an isolator mechanism from damage due to stretching. And it is an object of this invention to provide a shipping strap assembly which reduces the likelihood that machines will be transported without shipping straps.

SUMMARY OF THE INVENTION

In accordance with the invention, a shipping strap assembly is provided that will protect the isolator mechanisms of vibratory screening machines against exceeding their elastic limits.

An isolator mechanism is pivotally connected to the machine frame by one shaft at one of its ends and to the machine basket by another shaft at its other end. The shafts are aligned on parallel axes defining a common plane.

Shipping Strap Assemblies Protecting Isolator Mechanism Elastic Limits

The protective shipping strap assembly of the present invention includes a distally narrowing boss on one of the shafts, the boss being radially aligned on the common plane and extending away from the other shaft for expandable isolator mechanisms and toward the other shaft for compressible isolator mechanisms. The rigid strap has two apertures therethrough aligned on parallel axes defining another common plane capable of coincident positioning with the common plane of the shaft axes. One of the apertures has a contour to receive and ride on the boss. The other aperture has a contour to receive the other shaft. The apertures are spaced at a distance such that, when the boss is fully received in the one aperture and the other shaft is received in the other aperture, a distance between the axes of the shafts is maintained within an elastic limit of the isolator mechanism. The contour of the other aperture can be adapted to define a range of distances between the axes of the shafts within an elastic limit of the isolator mechanism.

In a preferred embodiment, the protective shipping strap assembly of the present invention includes an extension of one of the isolator shafts along its axis. This first extension has a first boss defining a first guide path that lies in the common plane of the shaft axes, extends from a radially most-distal point at an axially proximal end of the first boss to a radially most-proximal point at an axially distal end of the first boss and is bounded between a pair of limiting axes parallel to the first shaft axis, one limiting axis through a corresponding one of each of the radially most-distal and most-proximal end points of the first boss.

The protective shipping strap assembly of the present invention also includes an extension of the other isolator shaft along its axis. This second extension has a second boss defining a second guide path that lies in the common plane of the shaft axes, extends from a radial point at an axially proximal end of the second boss to another radial point at an axially distal end of the second boss and is bounded between another pair of limiting axes parallel to the second shaft axis, one limiting axis through a corresponding one of each of the end radial points of the second boss. The proximal end radial point is not more radially distal than the distal end radial point.

The first and second guide paths are outward of their respective first and second axes for expandable isolator mechanisms and inward of their respective first and second axes for compressible isolator mechanisms.

The protective shipping strap assembly of the present invention also includes a rigid strap with first and second apertures extending through corresponding first and second end portions of the strap. The first and second apertures are each aligned on corresponding longitudinal axes that define a second common plane. The common plane of the aperture axes can be positioned to coincide with the common plane of the shaft axes. The first aperture is contoured to receive the first boss and has contact points that are coordinated for abutting juxtaposition with the radially most-distal and most-proximal points on the first guide path when the first boss is fully received in the first aperture. The second aperture is contoured to receive the second boss and has contact points that are coordinated for contemporaneous abutting juxtaposition with corresponding radial points on the second guide path of the second boss when the second boss is fully received in the second aperture. The distances between corresponding contact points of the first and second apertures are within an elastic limit of the isolator mechanism.

The distances between corresponding contact points of the first and second apertures of the strap can be selected to limit a range of motion of the second boss relative to the first boss within the elastic limit of the isolator mechanism. The distances between corresponding contact points of the first and second apertures can be selected to prevent motion of the second boss relative to the first boss.

If the distal end portion of the first extension has a constant radius not greater than the radius to the radially most-proximal point at the axially distal end of the first boss and has a threaded distal end, then a nut threaded on the threaded distal end of the first extension can be used to tighten and loosen the first aperture into and out of abutting juxtaposition with the radially most-distal and most-proximal points on the first guide path, thus maintaining the distance between the first and second guide paths within the elastic limit of the isolator mechanism. In this embodiment also, the distances between corresponding contact points of the first and second apertures of the strap can be selected to limit the range of motion of the second boss relative to the first boss within the elastic limit of the isolator mechanism or the distances between corresponding contact points of the first and second apertures can be selected to prevent motion of the second boss relative to the first boss.

The first guide path, the second guide path or both guide paths may include at least one load-interfacing portion parallel to the first axis and the first aperture of the strap may include corresponding load-interfacing portions parallel to the first aperture longitudinal axis. In this embodiment, the first guide path may further include at least one non-load-interfacing portion aligned at least one angle to the first axis and the first aperture of the strap may include corresponding non-load-interfacing portions aligned at corresponding angles to the first aperture longitudinal axis.

Preferably, the shipping strap assembly will have a concentric cylindro-conical boss on one shaft and a cylindrical boss proximate on the other shaft and the shipping strap will have corresponding cylindro-conical and cylindrical apertures, the distance between the apertures being equal to the distance between the two shafts with the isolator mechanism at a normal loaded length. The cylindro-conical aperture is tapered for complemental juxtaposition against the boss on the one of the two shafts and the cylindrical aperture has a diameter sized to provide an annulus around the other of the two shafts. A nut threaded on the one shaft is used to tighten and loosen the cylindro-conical aperture into and out of complemental juxtaposition against the boss. Thus, when the cylindro-conical aperture and the boss are in complemental juxtaposition, a distance between the two shafts is maintained at a normal loaded length of the mechanism. The trailing end of the nut may have a handle adapted for tool-free manual operation. The taper of the cylindro-conical aperture and the diameter of the cylindrical aperture are coordinated to permit the cylindrical aperture to be disengaged from the other shaft without removing the nut from the one shaft. The cylindro-conical boss may have a conical mid-portion between leading and trailing end portions, a conical portion trailing a cylindrical portion or a conical portion leading a cylindrical portion.

BRIEF DESCRIPTION OF THE DRAWINGS

Other objects and advantages of the invention will become apparent upon reading the following detailed description and upon reference to the drawings in which.

While the invention will be described in connection with preferred embodiments thereof, it will be understood that it is not intended to limit the invention to those embodiments or to the details of the construction or arrangement of parts illustrated in the accompanying drawings.

DETAILED DESCRIPTION

The present shipping strap assembly is described in relation to presently known isolator mechanisms which permit the vibratory motion of the baskets of vibratory screening machines. As explained above, those isolator mechanisms are protected by known shipping straps which lock down the isolator mechanisms in a non-expanding and non-contracting condition.

Figure 1:
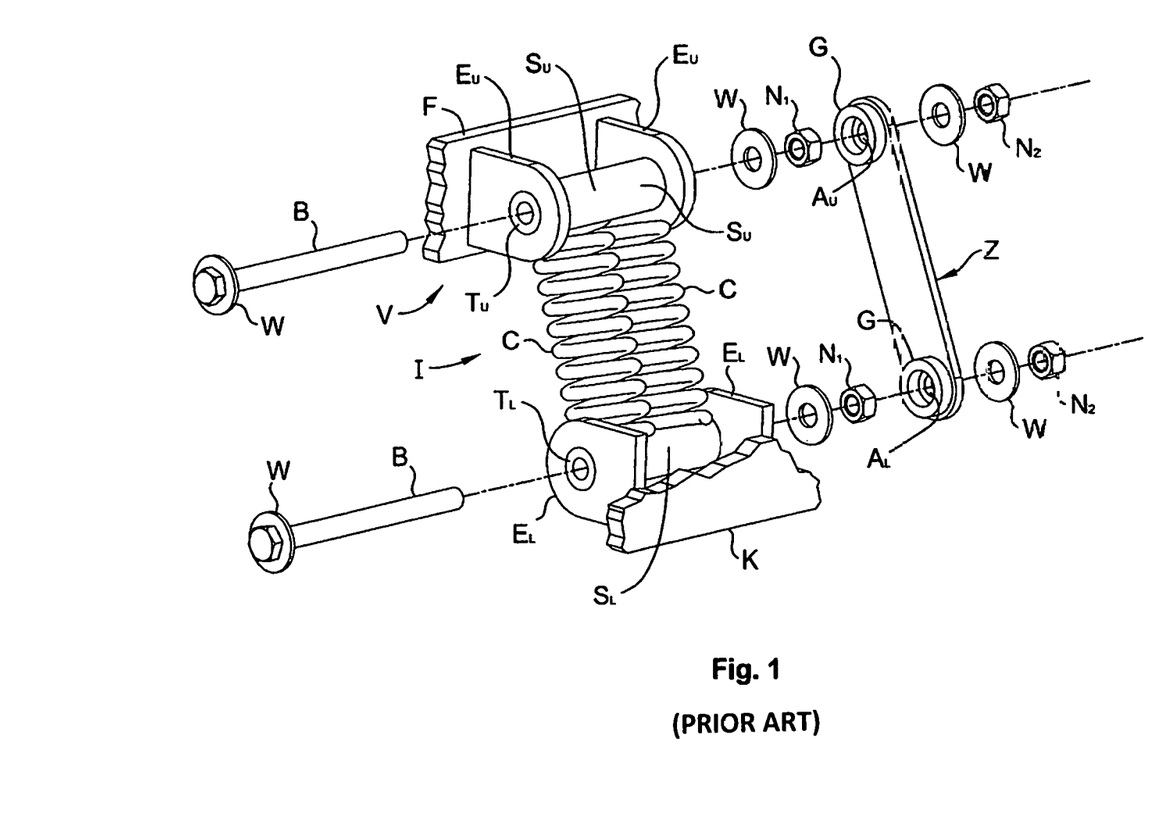
FIG. 1 is a perspective assembly view of a prior art isolator mechanism and shipping strap.

Prior Art Isolator Mechanisms and Lock-Down Shipping Straps:

Looking at FIG. 1, a prior art shipping strap Z is shown in association with a prior art isolator mechanism I of a vibratory screening machine V.

The isolator mechanism I shown is a pivoting linkage of two parallel expansion coil springs C. Each spring C is fixed at one end to an upper sleeve $S_U$ and at the other end to a lower sleeve $S_L$. The sleeves $S_U$ and $S_L$ are pivotally mounted on upper and lower tubes $T_U$ and $T_L$ which extend through upper and lower pairs of ears $E_U$ and $E_L$ on the frame F and basket K of the vibratory screening machine V, respectively. Bolts B extend through washers W and nuts $N_1$ on the threaded ends of the bolts B to secure the sleeves $S_U$ and $S_L$ between their respective ears $E_U$ and $E_L$.

For the prior art arrangement shown in FIG. 1, the isolator mechanism I is used to hang the basket K from the upper ears $E_U$ of the machine frame F. Thus, the weight of the basket K and its contents (not shown) tend toward expanding the coil springs C. Alternatively, isolator mechanism I could be used to support the basket K on the frame F on the isolator mechanism I. If so, the weight of the basket K and its contents (not shown) would tend toward compressing the coil springs C.

Continuing to looking at FIG. 1, if the prior art nuisance tasks hereinbefore discussed were first properly performed, the prior art shipping strap Z could then be installed to lock down the prior art isolator mechanism I. In the locked down condition, the gaskets G on the strap Z surround the nuts $N_1$ and abut the ears $E_U$ and $E_L$. The apertures A through the strap Z fit snugly on the bolts B, preventing all expansion or compression of the coil springs C. Additional nuts $N_2$ with washers W tightened down on the bolts B secure the strap Z against the exposed ends of the tubes $T_U$ and $T_L$ so that the isolator mechanism I is free to pivot but cannot be expanded or compressed.

However, still looking at FIG. 1, if the springs C have stretched or shortened at all, even within their elastic limit, the upper and lower apertures $A_U$ and $A_L$ in the strap Z cannot be simultaneously in alignment with their respective bolts B. Therefore, the strap Z cannot be installed on the isolator mechanism I for transport without levering the basket K to bring the aperture $A_L$ into the necessary alignment with its bolt B. Furthermore, after transport, in order to put the machine V into its normal operation, it is necessary to totally disconnect the strap Z and the nuts $N_2$ and their washers W from the isolator mechanism I and hope that they, and the tools used for the purpose, will later arrive at the next destination of the machine V.

Shipping Strap Assemblies Protecting Isolator Mechanism Elastic Limits:

According to the invention, a shipping strap assembly is provided which can protect an isolator mechanism against exceeding its elastic limit. Looking at FIG. 2, the protective shipping strap assembly 10 of the present invention includes a first longitudinal distal extension 20 of one of the isolator shafts, a second longitudinal distal extension 60 of the other isolator shaft and a rigid strap.

One Extension

Figure 2:
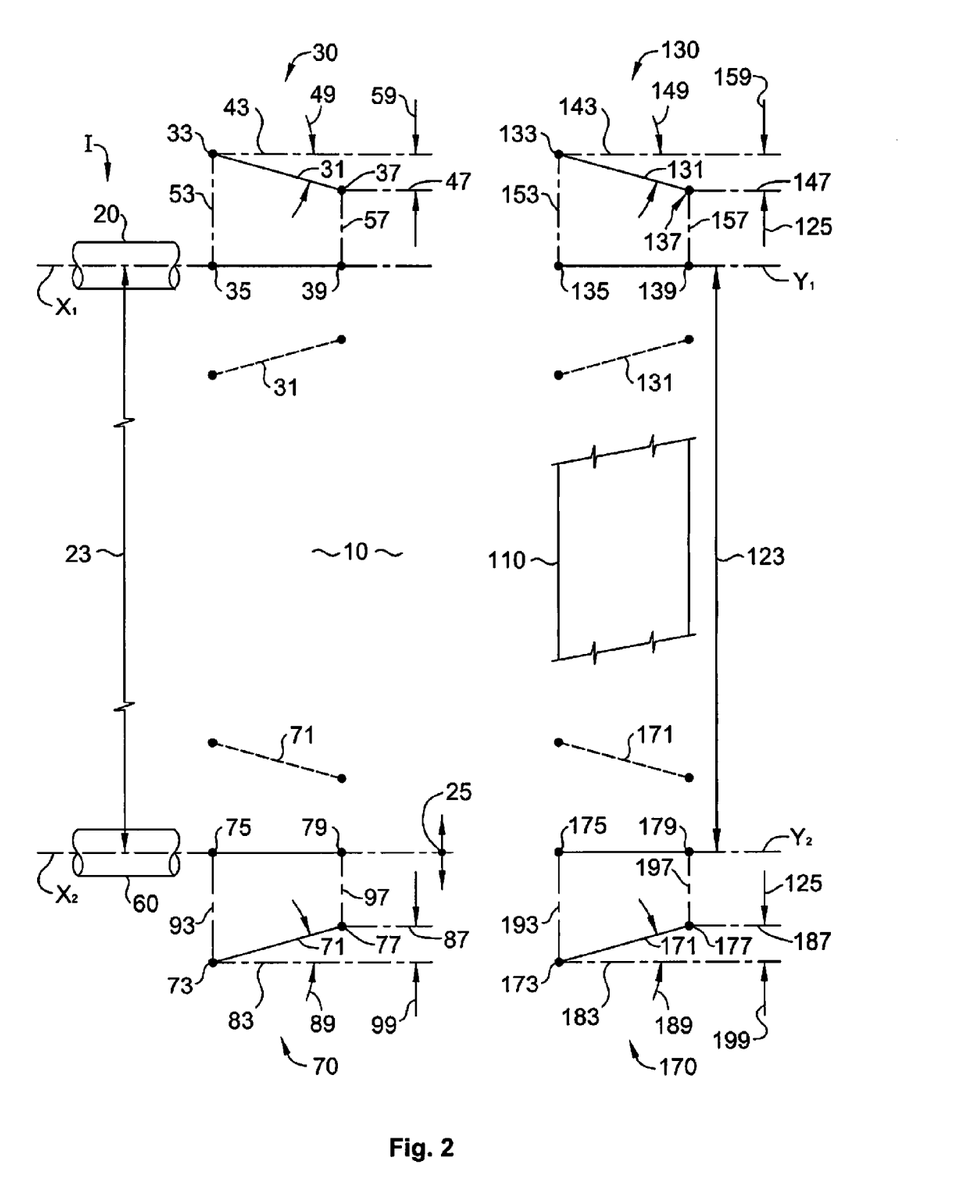
FIG. 2 is a one line representation of a shipping strap assembly according to the invention.

The first extension 20 has a boss 30 defining a guide path 31 that lies in the common plane defined by the longitudinal shaft axes $X_1$ and $X_2$. The guide path 31 extends from a point 33 that is radially most-distal from the axis $X_1$ at an axially proximal end 35 of the boss 30 to a point 37 that is radially most-proximal to the axis $X_1$ at an axially distal end 39 of the boss 30. The terms axially proximal and axially distal are herein used in relation to distances from the isolator mechanism I. The terms radially proximal and radially distal are herein used in relation to distances from their longitudinal axes of origin $X_1$ and $X_2$. The guide path 31 is also bounded between a pair of limiting axes 43 and 47 parallel to the shaft axis $X_1$. One limiting axis 43 extends through the radially most-distal point 33 of the boss 30 and the other limiting axis 47 extends through the most-proximal end point 37 of the boss 30. In the assembly 10 shown, the guide path 31 extends downwardly from the radially most-distal point 33 to the radially most-proximal point 37 in a straight line path 31 and at an angle 49. As shown, the radial distance 53 from the shaft axis $X_1$ to the radially most-distal point 33 is greater than the radial distance 57 from the shaft axis $X_1$ to the radially most-proximal point 37 by a distance 59.

The Other Extension

The other extension 60 has a boss 70 defining another guide path 71 that lies in the common plane defined by the shaft axes $X_1$ and $X_2$. As shown, this guide path 71 extends from a radial point 73 at an axially proximal end 75 of the second boss 70 to another radial point 77 at an axially distal end 79 of the second boss 70. This guide path 71 is also bounded between another pair of limiting axes 83 and 87 parallel to the second shaft axis $X_2$. One limiting axis 83 extends through the axially proximal radial point 73 and the other limiting axis 87 extends through the axially distal radial point 77 of its boss 70. In the assembly 10 as shown, the guide path 71 extends upwardly from the axially proximal radial point 73 to the axially distal radial point 77 in a straight line path 71 at an angle 89.

As shown, the radial distance 93 from the shaft axis $X_2$ to the axially proximal radial point 73 is greater than the radial distance 97 from the shaft axis $X_2$ to the axially distal radial point 77 by a distance 99. However, the axially proximal radial point 73 of the second boss 70 need not be more radially distal from the shaft axis $X_2$ than the axially distal radial point 77. The angle 89 and distance 99 could be 0°.

The Rigid Strap

The rigid strap 110 has a first aperture 130 extending through a corresponding first end portion of the strap 110 and a second aperture 170 extending through a corresponding second end portion of the strap 110. The first and second apertures 130 and 170 are each aligned on corresponding longitudinal axes $Y_1$ and $Y_2$ that define a second common plane. The common plane defined by the aperture axes $Y_1$ and $Y_2$ can be positioned to coincide with the common plane of the shaft axes $Y_1$ and $Y_2$. As shown, the first and second apertures 130 and 170 are contoured to receive the first and second bosses 30 and 70, respectively. However, while the common planes may be positioned to coincide, the aperture axes $Y_1$ and $Y_2$ may or may not be simultaneously coincident with the shaft axes $X_1$ and $X_2$.

As seen in FIG. 2, the first aperture 130 has a contact line 131 that lies in the common plane defined by the aperture axes $Y_1$ and $Y_2$. The contact line 131 extends from a radially most-distal point 133 at an axially proximal end 135 of the first aperture 130 to a radially most-proximal point 137 at an axially distal end 139 of the aperture 130. With respect to the strap 110, the terms axially proximal and axially distal are also used in relation to the isolator mechanism I. The contact line 131 is also bounded between a pair of limiting axes 143 and 147 parallel to the aperture axis $Y_1$. One limiting axis 143 extends through the radially most-distal point 133 of the aperture 130 and the other limiting axis 147 extends through the most-proximal end point 137 of the aperture 130. In the assembly 10 shown, the contact line 131 extends downwardly from the radially most-distal point 133 to the radially most-proximal point 137 in a straight line at an angle 149. As shown, the radial distance 153 from the shaft axis $Y_1$ to the radially most-distal point 133 is greater than the radial distance 157 from the shaft axis $Y_1$ to the radially most-proximal point 137 by a distance 159.

The second aperture 170 has a contact line 171 that lies in the common plane defined by the aperture axes $Y_1$ and $Y_2$. The contact line 171 extends from a radial point 173 at an axially proximal end 175 of the second aperture 170 to another radial point 177 at an axially distal end 179 of the second aperture 170. This contact line 171 is also bounded between another pair of limiting axes 183 and 187 parallel to the second aperture axis $Y_2$. One limiting axis 183 extends through the axially proximal radial point 173 and the other limiting axis 187 extends through the axially distal radial point 177 of its aperture 170. In the assembly 10 as shown, the contact line 171 extends upwardly from the axially proximal radial point 173 to the axially distal radial point 177 in a straight line at an angle 189.

As shown, the radial distance 193 from the aperture axis $Y_2$ to the axially proximal radial point 173 is greater than the radial distance 197 from the aperture axis $Y_2$ to the axially distal radial point 177 by a distance 199. However, the axially proximal radial point 173 of the second aperture 170 need not be more radially distal from the axis $Y_2$ than the axially distal radial point 177. Thus, the angle 189 and distance 199 could be 0°.

Angular Positioning of the Bosses in Relation to their Axes of Origin

As illustrated in FIG. 2 in solid lines, in expanding isolator mechanism applications, the isolator mechanism I will stretch in response to the force applied by the load suspended below the isolator mechanism I. Therefore, the guide paths 31 and 71 of the first and second bosses 30 and 70 and the contact lines 131 and 171 of the first and second apertures 130 and 170 will lie outward of their respective first and second shaft and aperture axes $X_1$ and $X_2$ and $Y_1$ and $Y_2$. However, as is also illustrated in FIG. 2 in dashed lines, in compressing isolator mechanism I applications, the isolator mechanism will be compressed in response to the force applied by the load supported above the isolator mechanism I. Therefore, the guide paths 31 and 71 of the first and second bosses 30 and 70 and the contact lines 131 and 171 of the first and second apertures 130 and 170 will lie inward of their respective first and second shaft and aperture axes $X_1$ and $X_2$ and $Y_1$ and $Y_2$. As shown, the inward guide path and contact lines are in the common planes of their axes $X_1$ and $X_2$ and $Y_1$ and $Y_2$, 180° apart.

Axis Alignment Enablement

Continuing to look at FIG. 2, since the isolator mechanism I is a resilient device, over time the normal load distance 23 between the shaft axes $X_1$ and $X_2$ may stretch or compress, as indicated by directional arrows 25, within their elastic limit, depending on whether the isolator mechanism I is a resiliently expanding or compressing device. Therefore, at the time of installation of the substantially inelastic strap 110 on the isolator I, it may not be possible to simultaneously align the shaft axes $X_1$ and $X_2$ with their respective strap aperture axes $Y_1$ and $Y_2$.

However, since the angles 49 and 149 are greater than 0° and, therefore, the radius 57 of the boss 30 at its axially distal end 39 is smaller than the radius 153 of the first aperture 130 at its axially proximal end 135, the strap apertures 130 and 170 can be aligned with their respective isolator mechanism bosses 30 and 70 regardless of whether the axes $X_1$ and $X_2$ are aligned. As long as the distance 23 between the axes $X_1$ and $X_2$ has not increased or decreased by more than the difference 59 in radial distance between the axially distal and proximal guide line points 37 and 33, the strap apertures 130 and 170 can still be aligned with their respective isolator mechanism bosses 30 and 70 regardless of whether the axes $X_1$ and $X_2$ are aligned. Thus, the principle can be applied to one boss 30 and its corresponding aperture 130.

This principle may, but need not necessarily, be applied in a given application to both the first boss 30 and aperture 130 as discussed above and also to the second boss 70 and second aperture 170 by use of angles 89 and 189 that are greater than 0°. As long as the distance 23 between the axes $X_1$ and $X_2$ has not increased or decreased by more than the sum of the differences 59 and 99 in radial distance between the axially distal and proximal guide line points 37 and 33 and 77 and 73, respectively, the strap apertures 130 and 170 can be aligned with their respective isolator mechanism bosses 30 and 70 regardless of whether the axes $X_1$ and $X_2$ are aligned.

Moreover, the simultaneous alignment of the bosses 30 and 70 with the apertures 130 and 170 can be further aided even if the second guide path and contact line angles 89 and 189 are 0°. If so, the radial distances 53 and 57 are substantially equal and the radial distances 193 and 197 are equal but, if the radial distances 53 and 57 are less than the radial distances 193 and 197, a gap 99 will separate the second guide path and contact lines 71 and 171, providing leeway for alignment of the second boss 70 and the second aperture 170.

Normal Load Length Restoration Enabled by One Boss/Aperture Gap

As long as the combined distances 59 and 99 are within the elastic limits of the isolator mechanism I, if the bosses 30 or 30 and 70 are not yet fully nested in their respective apertures 130 or 130 and 170 when initial contact is made between both bosses 30 and 70 and their respective apertures 130 and 170, continued axial movement toward full nesting will either draw expanded isolator mechanism shafts closer together or spread compressed isolator mechanism shafts further apart.

Assume an application in which the angles 89 and 189 of the second boss guide path 71 and the second aperture contact line 171 are equal to 0° and the radial distances 93 and 97 are substantially equal to the radial distances 193 and 197. Once the boss 70 enters snugly into the aperture 170 and the proximal contact point 133 of the first aperture 130 comes into contact with the guide path 31 of the first boss 30, further movement toward full nesting will either draw expanded isolator mechanism shafts closer together or spread compressed isolator mechanism shafts further apart. However, sliding the strap aperture 170 snugly onto the boss 70 may be difficult.

Assume another application in which the angles 89 and 189 of the second boss guide path 71 and the second aperture contact line 171 are equal to 0° and the radial distances 93 and 97 are less than the radial distances 193 and 197, providing a gap 99 between the boss 70 and the aperture 170. Once again, after the second boss 70 enters into the second aperture 170 and the proximal contact point 133 of the first aperture 130 comes into contact with the guide path 31 of the first boss 30. Unless it should coincidentally occur, further movement toward full nesting will eventually cause the second aperture 170 to come into contact with the second boss 70. Thereafter, further movement toward full nesting will either draw expanded isolator mechanism shafts closer together or spread compressed isolator mechanism shafts further apart. The gap 99 between the boss 70 and aperture 170 will make it easier to slide the strap aperture 170 over the boss 70 while still providing the desired drawing of the expanded isolator mechanism shaft extensions 20 and 60 closer together or spreading of the compressed isolator mechanism shaft extensions 20 and 60 further apart. Furthermore, the size of the gap 99 can be selected to facilitate alignment of the boss 70 and aperture 170, to facilitate drawing expanded isolator mechanism shaft extensions 20 and 60 closer together or spreading compressed isolator mechanism shaft extensions 20 and 60 further apart or to facilitate both alignment and drawing/spreading. However, the gap 99 must be selected such that the isolator mechanism I does not stretch beyond its elastic limit.

Assume yet another application in which the angles 89 and 189 of the second boss guide path 71 and the second aperture contact line 171 are not equal to 0° and the radial distances to the second guide line 71 are less than the radial distances to the second contact line 171, providing a gap 99 between the boss 70 and the aperture 170. Once again, after the second boss 70 enters into the second aperture 170 and the proximal contact point 133 of the first aperture 130 comes into contact with the guide path 31 of the first boss 30. Unless it should coincidentally occur, further movement toward full nesting will eventually cause the second aperture 170 to come into contact with the second boss 70. Thereafter, further movement toward full nesting will either draw expanded isolator mechanism shafts closer together or spread compressed isolator mechanism shafts further apart. The gap 99 between the boss 70 and aperture 170 will make it easier to slide the strap aperture 170 over the boss 70 while still providing the desired drawing of the expanded isolator mechanism shaft extensions 20 and 60 closer together or spreading of the compressed isolator mechanism shaft extensions 20 and 60 further apart. Furthermore, the size of the gap 99 can be selected to facilitate alignment of the boss 70 and aperture 170, to facilitate drawing expanded isolator mechanism shaft extensions 20 and 60 closer together or spreading compressed isolator mechanism shaft extensions 20 and 60 further apart or to facilitate both alignment and drawing/spreading. However, the gap 99 must be selected such that the isolator mechanism I does not stretch beyond its elastic limit.

Variations in the Shapes of Bosses and Apertures

As shown in FIG. 2, the first and second apertures 130 and 170 have substantially identical shapes as the first and second bosses 30 and 70 that they respectively receive. The term "substantially identical" when used herein in reference to shapes is intended to allow for that slight variation in dimensions necessary for the full nesting of the bosses 30 and 70 in their respective apertures 130 and 170. The term "substantially identical" used in reference to points, and particularly in reference to axially most proximal and distal points, is intended to allow for that slight variation in dimensions necessary to permit abutting the axially most proximal and distal guide path points 33 and 37 on the first boss 30 with their respective most proximal and distal contact points 133 and 137 on the first aperture 130 and to permit abutting the axially most proximal and distal guide path points 73 and 77 on the second boss 70 with their respective most proximal and distal contact points 173 and 177 on the second aperture 170.

The configuration of the guide paths 31 and 71 of the bosses 30 and 70 need not necessarily be single straight lines as shown in FIG. 2. Looking at FIGS. 3A-3F, the guide paths 31 and 71 may include one or more straight load-bearing segments 32 and 72 substantially parallel to the shaft axes $X_1$ and $X_2$ and one or more straight non-load-bearing segments 38 and 78 angled with respect to the shaft axes $X_1$ and $X_2$, respectively. The substantially parallel segments 32 or 72 are considered load-bearing because, when fully engaged, they tend to maintain a constant axial relationship between the bosses 30 and 70 and the apertures 130 and 170. The angled segments 38 and 78 are considered non-load-bearing because, when fully engaged, they tend to cause the apertures 130 and 170 to shift distally along the bosses 30 and 70. While the angled segments 38 and 78 can also carry loads, they do not do so as efficiently.

Figure 3A:
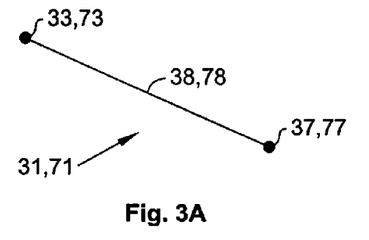
FIGS. 3A-3G are one line representations of various embodiments of the boss of an isolator mechanism shaft extension according to the invention.
Figure 3B:
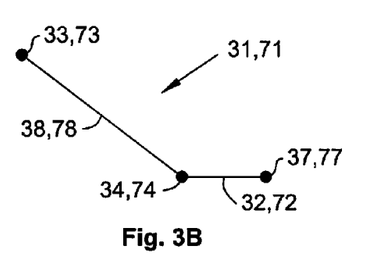
Figure 3C:
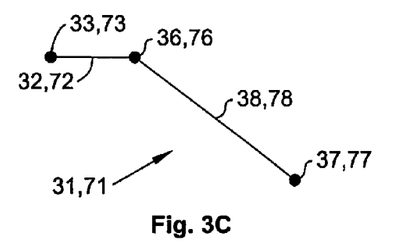
Figure 3D:
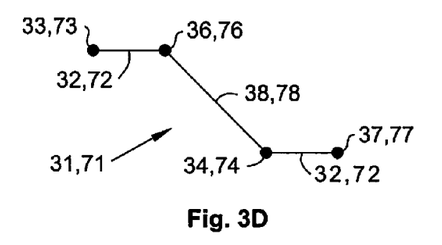
Figure 3E:
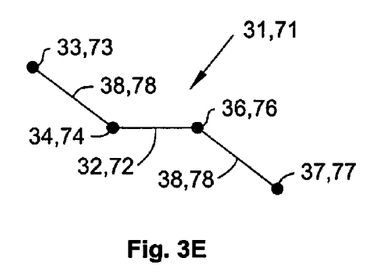
Figure 3F:
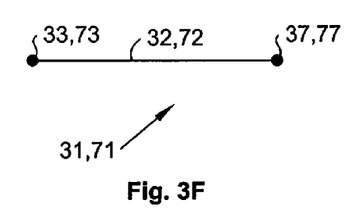

In FIG. 3A, a single straight line non-load-bearing segment 38 or 78, like the guide paths 31 and 71 of FIG. 2, is illustrated. In FIG. 3B, a single straight line non-load-bearing segment 38 or 78 is distally followed by a single straight line load-bearing segment 32 or 72. In FIG. 3C, a single straight line load-bearing segment 32 or 72 is distally followed by a single straight line non-load-bearing segment 38 or 78. In FIG. 3D, a single straight line non-load-bearing segment 38 or 78 is proximally preceded and distally followed by single straight line load-bearing segments 32 or 72. In FIG. 3E, a single straight line load-bearing segment 32 or 72 is proximally preceded and distally followed by single straight line non-load-bearing segments 38 or 78. In FIG. 3F, a single straight line load-bearing segment 32 or 72 is illustrated.

Figure 3G:
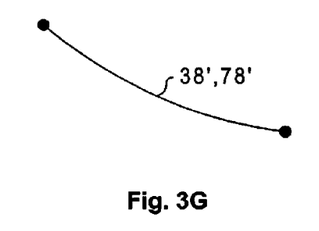

For any of the guide paths 31 and 71 illustrated in FIGS. 3A-3F, any straight line non-load bearing segment 38 or 78 can be replaced by an irregular non-load-bearing segment 38' or 78', such as is exemplified in FIG. 3G, provided the irregular contours of the segments 38' and 78' permit their respective bosses 30 or 70 to be fully received in their respective apertures 130 and 170 with their respective axially proximal and distal guide path points 33 and 37 and 73 and 77 and contact line points 133 and 137 and 173 and 177 in abutment.

Considering FIGS. 2 and 3A-3G taken together, in any embodiment of the shipping strap assembly, the contours of the contact lines 131 and 171 of the apertures 130 and 170 will be coordinated to cooperate with the contours of the guide paths 31 and 71 of the bosses 30 and 70. The first aperture 130 has contact points 133 and 137 that are coordinated for abutting juxtaposition with the radially most-distal and most-proximal points 33 and 37 on the first guide path 31 when the first boss 30 is fully received in the first aperture 130 and the second aperture 170 is contoured to receive the second boss 70 and has contact points 137 and 177 that are coordinated for contemporaneous abutting juxtaposition with corresponding radial points 73 and 77 on the second guide path 71 of the second boss 70 when the second boss 70 is fully received in the second aperture 170.

Axial Spacing Distances Related to Isolator Mechanism Elastic Limits

Furthermore, as best seen in FIG. 2, the distance 125 between corresponding contact points 137 and 177 of the first and second apertures must be within the elastic limit of the isolator mechanism I. That distance 125 can be selected to limit a range of motion of the second boss 70 relative to the first boss 30 within the elastic limit of the isolator mechanism I or can be selected to prevent motion of the second boss 70 relative to the first boss 30.

Figure 4:
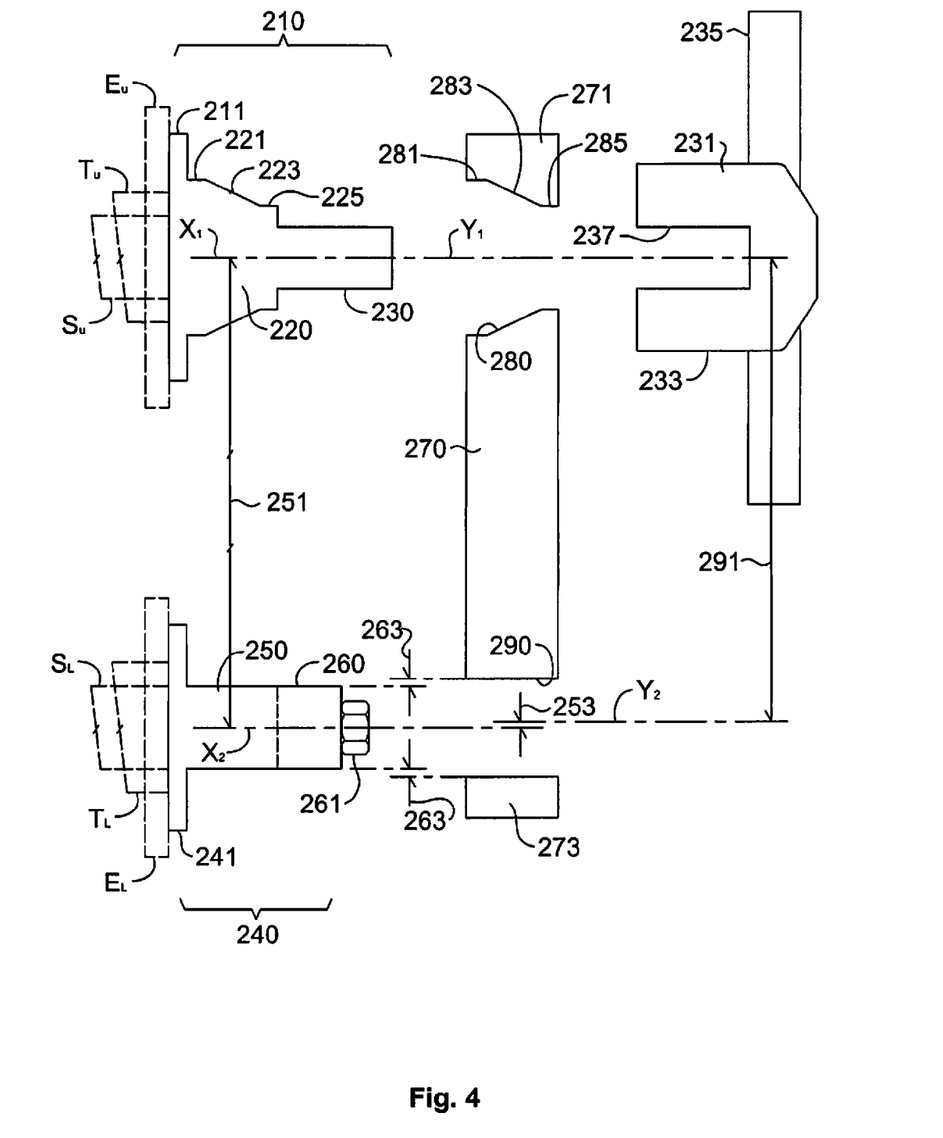
FIG. 4 is a cross-sectional assembly view of a shipping strap assembly according to the invention taken in a plane common to the isolator mechanism shaft and strap aperture axes.

Concentrically Symmetrical Embodiments of the Shipping Strap Assembly:

Now turning to FIG. 4, a concentrically symmetric embodiment of the shipping strap assembly 200 includes shaft extensions 210 and 240 and a strap 270. The extensions 210 and 240 extend distally from, and are aligned on the axes $X_1$ and $X_2$ of, the shafts of an isolator mechanism I and include bosses 220 and 250, respectively. The shipping strap 270 is a rigid member with apertures 280 and 290 through its end portions 271 and 273.

The bosses 220 and 250 of the extensions 210 and 240 illustrated in FIG. 4 are defined by the 360° rotation of the guide paths 31 and 71 of FIGS. 3D and 3F about the axes $X_1$ and $X_2$, respectively. Thus, the boss 220 has a large diameter proximal cylindrical portion 221, a conical portion 223 and a small diameter distal cylindrical portion 225, all concentrically and symmetrically aligned on the axis $X_1$ and the boss 250 is cylindrical and aligned on the axis $X_2$.

Similarly, the strap apertures 280 and 290 illustrated in FIG. 4 are aligned on the axes $Y_1$ and $Y_2$ of the strap 270. The apertures 280 and 290 are also defined by the 360° rotation of the guide paths 31 and 71 of FIGS. 3D and 3F about the axes $Y_1$ and $Y_2$, respectively. Thus, the aperture 280 has a large diameter proximal cylindrical portion 281, a conical portion 283 and a small diameter distal cylindrical portion 285, all concentrically and symmetrically aligned on the axis $Y_1$ and the aperture 290 is cylindrical and aligned on the axis $Y_2$.

However, the bosses 220 and/or 250 and the apertures 280 and/or 290 can be defined by generating any guide path consistent with the examples explained in relation to FIGS. 3A-3G about the axes $X_1$ and/or $X_2$, and $Y_1$ and/or $Y_2$, respectively, provided cooperable bosses and apertures are compatible as earlier explained herein. The first boss 220 and cooperable aperture 280 in the embodiment of FIG. 4 include both cylindrical and conical portions and are, therefore, sometimes referred to as cylindro-conical. Such an identification is appropriate to any of the configurations of FIGS. 3B-3E while the configurations of FIGS. 3A and 3F are conical and cylindrical, respectively.

Moving in a distal direction from the isolator mechanism I, the first extension 210 includes a landing flange 211, the boss 220 and a threaded distal end portion 230. A nut 231 will be threaded onto the distal end portion 230. The flange 211 serves as a landing area against an upper ear $E_U$ of the frame F of the vibratory machine V shown in FIG. 1. The first extension 210 may be an integral part of, or an add-on fixed to, the first shaft of the isolator mechanism I.

Again moving in a distal direction from the isolator mechanism I, the second extension 240 includes a landing flange 241, the boss 250 and a threaded distal end portion 260. The flange 241 serves as a landing area against a lower ear $E_L$ of the basket K of the vibratory machine V shown in FIG. 1. Optionally, a nut 261 can be threaded onto the threaded distal end portion 260 of the second extension 240 to hold the second extension 240 and the isolator mechanism I together. As shown, the outer diameter of the nut 261 does not overlap the outer diameter of the shaft extension 240. The second extension 240 may be an integral part of, or an add-on fixed to, the second shaft of the isolator mechanism I.

The distance 291 between the axes $Y_1$ and $Y_2$ of the apertures 280 and 290 is equal to the distance 251 between the axes $X_1$ and $X_2$ of the shafts of the isolator mechanism I when the isolator mechanism I is at a normal loaded length. As shown in FIG. 4, the shaft axis distance 251 has a slight stretch 253 beyond its normal loaded length due to permanent deformation of the isolator mechanism I so that, when the shaft axes $X_1$ and $X_2$ are aligned, the second shaft is still within the range of alignment with the second aperture 290. The cylindro-conical boss 220 on the first shaft extension 210 and the cylindro-conical aperture 280 through the strap 270 are complemental so that, when the boss 220 is fully nested in the aperture 280, the circumferences generated by the points 33, 34, 36 and 37 and the surfaces generated by the lines 38, 32 and 38 of FIG. 3D are substantially coincident. The cylindrical boss 250 on the second shaft extension 240 and the cylindrical aperture 290 through the strap 270 have an annulus 263 therebetween which is preferably centered on the axes $X_2$ and $Y_2$ when the isolator mechanism I is at a normal loaded length and, as shown, is not centered because of the stretch 253. Still, as will hereinafter be seen in relation to FIG. 6B, the annulus 263 is sized so that, when the cylindro-conical boss 220 is fully seated in the cylindro-conical aperture 280 and the cylindrical boss 250 is fully inserted into the cylindrical aperture 290, the isolator mechanism I and strap 270 are in the shipping configuration and the isolator mechanism I cannot extend beyond its elastic limit.

Looking at FIG. 4, to achieve the shipping configuration, the cylindro-conical and cylindrical apertures 280 and 290 of the strap 270 are first generally aligned with the cylindrical extensions 210 and 240 of the isolator mechanism shafts, approximately on their respective axes $X_1$ and $X_2$. The annulus 263 shown allows some leeway, and the large diameter cylindrical portion 281 of the strap aperture 280 affords much greater leeway, for initially sliding the strap 270 onto the extensions 210 and 240 of the isolator mechanism I.

Once general alignment is achieved, sliding of the strap 270 onto the extensions 210 and 240 proceeds. If the initial alignment is not perfect, the large diameter cylindrical portion 281 of the strap aperture 280 will cooperate with the conical middle portion 223 of the boss 220 to bring the cylindro-conical strap aperture 280 into registration and eventually into abutment with the boss 220. At the same time, the strap 270 comes into abutment with the flanges 211 and 241 of the extensions 210 and 240 of the isolator mechanism I.

Once the threaded distal end portion of the extension 210 is emerging through the cylindro-conical aperture 280 of the strap 270, the nut 231 can be threaded onto the threaded distal end portion 230 of the extension 210 and manually tightened to drive the strap 270 toward the flange 211. Thus, the cylindro-conical boss 220 and strap aperture 280 are brought into complemental juxtaposition. The preferred nut 231 has a body 233 with an internally threaded portion of length 237 slightly less than the length of the distal end portion 230 of the first extension 210. Thus, the nut 231 binds up on the shaft 230 in a locking manner.

Some other concentrically symmetrical embodiments of the shipping strap assembly are illustrated in FIGS. 5A-5D.

The operating principles above described apply to the embodiments of FIGS. 5A-5D.

Figure 5A:
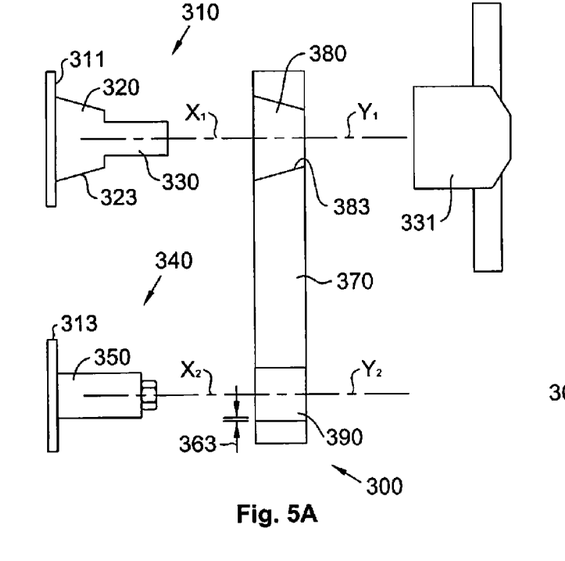
FIGS. 5A-5D are cross-sectional assembly views of several concentrically symmetrical embodiments of the shipping strap assembly according to the invention taken in a plane common to the isolator mechanism shaft and strap aperture axes.

In FIG. 5A, the shipping strap assembly 300 includes shaft extensions 310 and 340 with bosses 320 and 350, respectively, and a strap 370 with apertures 380 and 390. The bosses 320 and 350 and apertures 380 and 390 are defined by the 360° rotation of the guide paths 31 and 71 of FIGS. 3A and 3F about the axes $X_1$ and $X_2$ and $Y_1$ and $Y_2$, respectively. Thus, the first boss 320 and aperture 380 have only conical portions 323 and 383 concentrically and symmetrically aligned on the axes $X_1$ and $Y_1$, respectively, and the second boss 350 and aperture 390 are cylindrical and aligned on the axes $X_2$ and Y2, respectively. As will hereinafter be seen in relation to FIG. 6A, the cylindrical boss 350 on the second shaft extension 340 and the cylindrical aperture 390 through the strap 370 have an annulus 363 therebetween sized so that, when the conical boss 320 is fully seated in the conical aperture 380 and the cylindrical boss 350 is fully inserted into the cylindrical aperture 390, the isolator mechanism I and the strap 370 are in the shipping configuration and the isolator mechanism I cannot extend beyond its elastic limit. The nut 331 will be threaded onto the distal end portion 330 of the first extension 310. The flanges 311 and 313 serve as landing areas against upper and lower ears $E_U$ and $E_L$ of the frame F and basket K of the vibratory machine V shown in FIG. 1. The extension 310 and 340 may be integral parts of, or add-ons fixed to, the shafts of the isolator mechanism I.

Figures 5B, 6B:
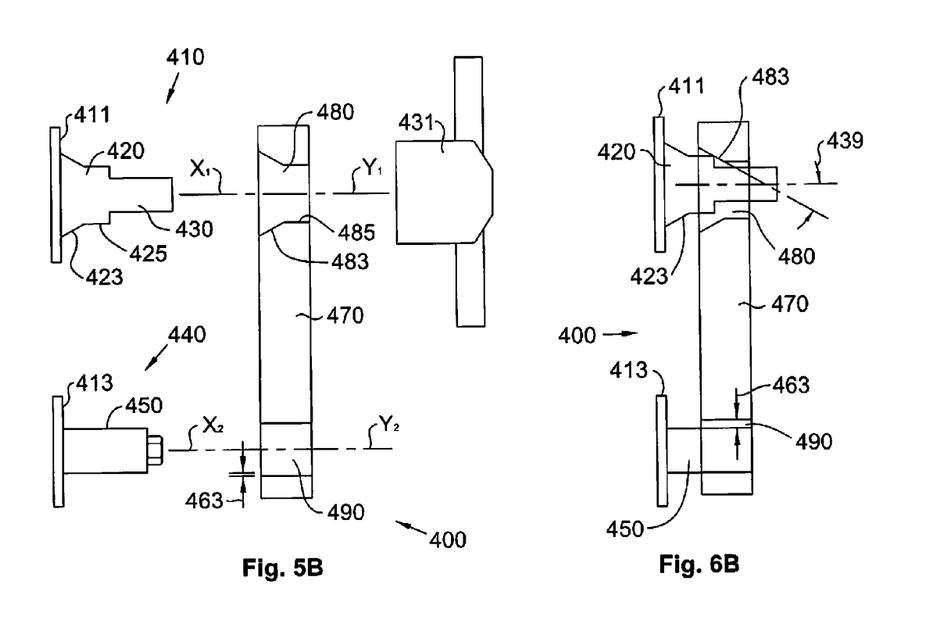
FIGS. 6A-6B are cross-sectional views of the shipping strap assembly embodiments of FIGS. 5A and 5B, respectively, with the straps partially installed on the isolator mechanism shaft extensions.

In FIG. 5B, the shipping strap assembly 400 includes shaft extensions 410 and 440 with bosses 420 and 450, respectively, and a strap 470 with apertures 480 and 490. The bosses 420 and 450 and apertures 480 and 490 are defined by the 360° rotation of the guide paths 31 and 71 of FIGS. 3B and 3F about the axes $X_1$ and $X_2$ and $Y_1$ and $Y_2$, respectively. Thus, the first boss 420 and aperture 480 have proximal conical portions 423 and 483 and small diameter distal cylindrical portions 425 and 485, all concentrically and symmetrically aligned on the axes $X_1$ and $Y_1$, respectively, and the second boss 450 and aperture 490 are cylindrical and aligned on the axes $X_2$ and Y2, respectively. The cylindrical boss 450 on the second shaft extension 440 and the cylindrical aperture 490 through the strap 470 have an annulus 463 therebetween sized so that, when the cylindro-conical boss 420 is fully seated in the cylindro-conical aperture 480 and the cylindrical boss 450 is fully inserted into the cylindrical aperture 490, the isolator mechanism I and the strap 470 are in the shipping configuration and the isolator mechanism I cannot extend beyond its elastic limit. A nut 431 will be threaded onto the distal end portion 430 of the first extension 410. The flanges 411 and 413 serve as landing areas against upper and lower ears $E_U$ and $E_L$ of the frame F and basket K of the vibratory machine V shown in FIG. 1. The extensions 410 and 440 may be an integral parts of, or add-ons fixed to, the shafts of the isolator mechanism I.

Figure 5C:
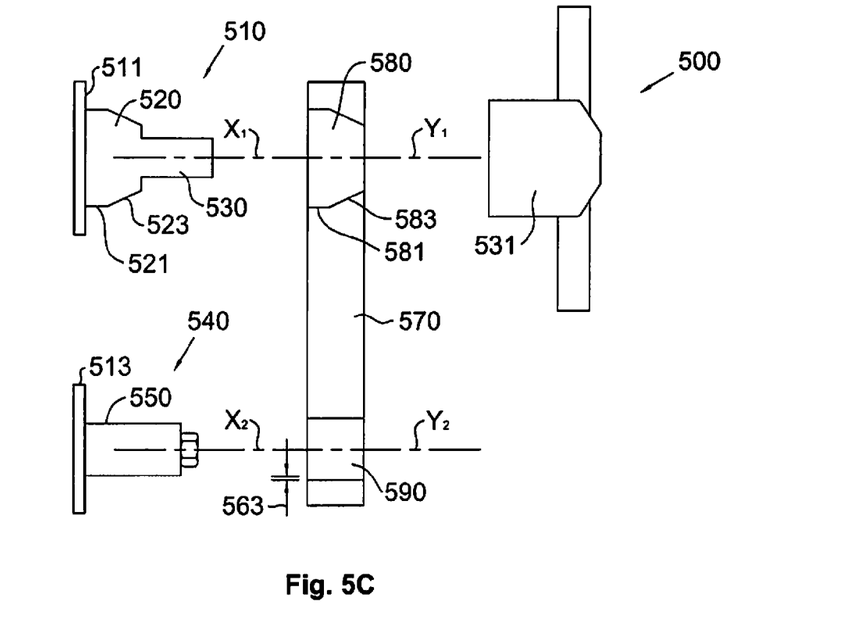

In FIG. 5C, the shipping strap assembly 500 includes shaft extensions 510 and 540 with bosses 520 and 550, respectively, and a strap 570 with apertures 580 and 590. The bosses 520 and 550 and apertures 580 and 590 are defined by the 360° rotation of the guide paths 31 and 71 of FIGS. 3C and 3F about the axes $X_1$ and $X_2$ and $Y_1$ and $Y_2$, respectively. Thus, the first boss 520 and aperture 580 have proximal cylindrical portions 521 and 581 and small diameter distal conical portions 523 and 583 concentrically and symmetrically aligned on the axes $X_1$ and $Y_1$, respectively, and the second boss 550 and aperture 590 are cylindrical and aligned on the axes $X_2$ and Y2, respectively. The cylindrical boss 550 on the second shaft extension 540 and the cylindrical aperture 590 through the strap 570 have an annulus 563 therebetween sized so that, when the cylindro-conical boss 520 is fully seated in the cylindro-conical aperture 580 and the cylindrical boss 550 is fully inserted into the cylindrical aperture 590, the isolator mechanism I and the strap 570 are in the shipping configuration and the isolator mechanism I cannot extend beyond its elastic limit. The nut 531 will be threaded onto the distal end portion 530 of the first extension 510. The flanges 511 and 513 serve as landing areas against upper and lower ears $E_U$ and $E_L$ of the frame F and basket K of the vibratory machine V shown in FIG. 1. The extensions 510 and 540 may be integral parts of, or add-ons fixed to, the shafts of the isolator mechanism I.

Figure 5D:
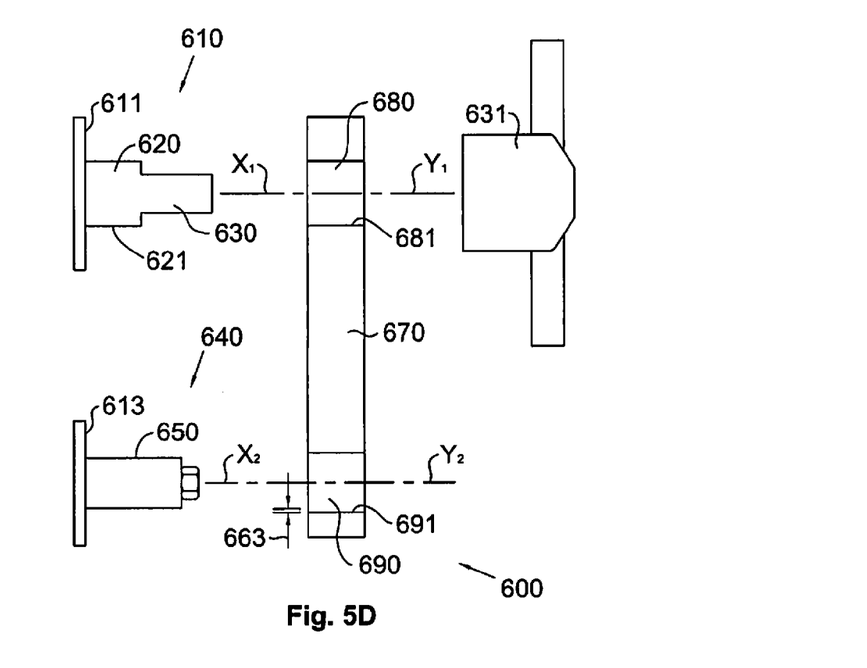

In FIG. 5D, the shipping strap assembly 600 includes shaft extensions 610 and 640 with bosses 620 and 650, respectively, and a strap 670 with apertures 680 and 690. The bosses 620 and 650 and apertures 680 and 690 are defined by the 360° to rotation of the guide paths 31 and 71 of FIG. 3F about the axes $X_1$ and $X_2$ and $Y_1$ and $Y_2$, respectively. The bosses 620 and 650 and apertures 680 and 690 have only cylindrical portions 621 and 651 and 681 and 691 concentrically and symmetrically aligned on the axes $X_1$, and $Y_1$ and $X_2$ and Y2, respectively. The cylindrical boss 620 on the first shaft extension 100 and the cylindrical aperture 680 through the strap 670 are of substantially equal diameter. The cylindrical boss 650 on the second shaft extension 640 and the cylindrical aperture 690 through the strap 670 have an annulus 663 therebetween sized so that, when the first cylindrical boss 620 is snuggle and fully seated in the conical aperture 680 and the second cylindrical boss 650 is fully inserted into the cylindrical aperture 690, the isolator mechanism I and the strap 670 are in the shipping configuration and the isolator mechanism I cannot extend beyond its elastic limit. The nut 631 will be threaded onto the distal end portion 630 of the first extension 610. The flanges 611 and 613 serve as landing areas against upper and lower ears $E_U$ and $E_L$ of the frame F and basket K of the vibratory machine V shown in FIG. 1. The extensions 610 and 640 may be integral parts of, or add-ons fixed to, the shafts of the isolator mechanism I. In this configuration, no axial alignment leeway or isolator mechanism length restoration are afforded by the first boss 620 and aperture 680. However, the annulus 663 does afford axial alignment leeway and a range of motion of the isolator mechanism second shaft extension 640 within the second strap aperture 640 within the elastic limits of the isolator mechanism I. While the first boss 620 and strap aperture 680 are locked down, the isolator mechanism I is not.

Figure 6A:
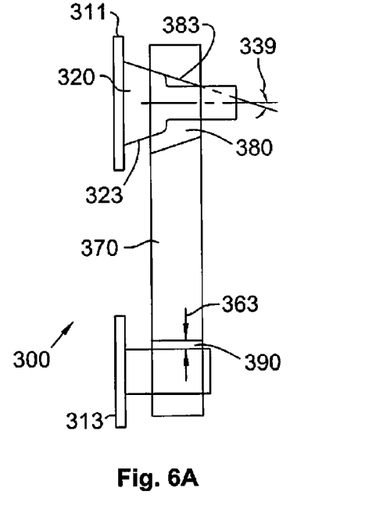

Turning now to FIGS. 6A and 6B, which correspond to the embodiments of FIGS. 5A and 5B, respectively, the taper angles 339 and 439 of the cooperable conical portions 323 and 423 and 383 and 483 of the bosses 320 and 420 and apertures 380 and 480, respectively, and/or the size of the annuli 363 and 463 between the isolator mechanism shafts and their corresponding shipping strap apertures 390 and 490 can be predetermined to facilitate installation of the shipping straps 370 and 470 and the use of the shipping strap assemblies 300 and 400 to restore an isolator mechanism toward its normal load condition length.

Figure 7:
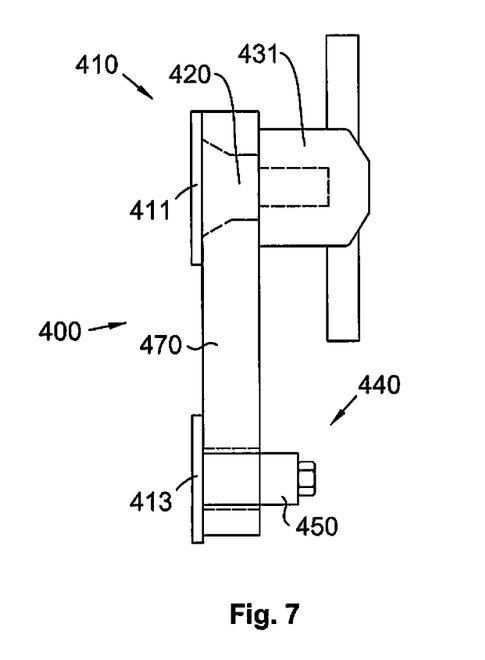
FIG. 7 is a cross-sectional view of the shipping strap assembly embodiment of FIGS. 5B and 6B with the strap fully installed on the isolator mechanism shaft extensions.

Looking at FIG. 7, the shipping strap 470 of FIGS. 5B and 6B is fully installed on the isolator mechanism. The strap 470 is snuggly sandwiched between the upper flange 411 and the nut 431. The strap 470 also abuts the lower flange 413. The strap 470 is fully raised by the cooperating conical portions 423 and 483 of the upper boss 20 and the aperture 480, restoring the isolator mechanism toward its normal load condition length.

Advantages:

The use of a shipping strap assembly with at least one at least partially conical boss and cooperable aperture facilitates installation of the shipping strap on the isolator mechanism without need for manipulating the basket of the vibratory screening machine.

Furthermore, the use of a shipping strap assembly with at least one at least partially conical boss and cooperable aperture facilitates use of the shipping strap assembly to restore an isolator mechanism, the length of which has been displaced from its normal load condition.

Also, the use of a shipping strap assembly providing an annulus between a shaft of the isolator mechanism and its corresponding shipping strap aperture facilitates installation of the shipping strap on the isolator mechanism without need for manipulating the basket of the vibratory screening machine. The annulus being less than the elastic limit, the isolator mechanism is protected against stretching.

And the use of a shipping strap assembly with at least one at least partially conical boss and cooperable aperture facilitates installation of the shipping strap on the isolator mechanism without the need for manipulating the basket of the vibratory screening machine.

The taper angle of the cooperable conical portions of the boss and aperture and/or the size of the annulus between the isolator mechanism shaft and its corresponding shipping strap aperture can be predetermined to enhance the above noted capabilities of the shipping strap assembly.

Preferably, the lengths of the shaft extensions, the tapers of the cooperable conical boss and aperture portions, if any, and the size of the annulus, if any, are also coordinated to permit disengagement of the strap from the isolator mechanism without ever disengaging the operating nut from the threaded extension of its shaft. In this case, the threaded extension can further be adapted to prevent removal of the operating nut from the threaded extension of its shaft, thereby assuring that neither the strap nor the nut can be lost.

Thus, it is apparent that there has been provided, in accordance with the invention, a vibratory screening machine shipping strap assembly that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For protecting an isolator mechanism against exceeding its elastic limit, the mechanism being pivotally connected at one of its ends to a frame of a vibratory screening machine by a first shaft and at another of its ends to a basket of the vibratory screening machine by a second shaft, the shafts being aligned on first and second parallel axes, respectively, defining a common plane, a shipping strap assembly comprising:

a first extension of the first shaft along the first axis, said first extension having a first boss defining a first guide path lying in the common plane of the shaft axes, extending from a radially most-distal point at an axially proximal end thereof to a radially most-proximal point at an axially distal end thereof and bounded between a first pair of limiting axes parallel to the first shaft axis, one said limiting axis through a corresponding one of each of said radially most-distal and most-proximal end points of said first boss;

a second extension of the second shaft along the second axis, said second extension having a second boss defining a second guide path lying in the common plane of the shaft axes, extending from one radial point at an axially proximal end thereof to another radial point at an axially distal end thereof and bounded between a second pair of limiting axes parallel to the second shaft axis, one said limiting axis of said second pair through a corresponding one of said end radial points of said second boss, said another radial point being not more radially distal than said one radial point;

said first and second guide paths being outward of their respective first and second axes for expandable isolator mechanisms and inward of their respective first and second axes for compressible isolator mechanisms; and a rigid strap having first and second apertures extending through corresponding first and second end portions thereof, respectively, said first and second apertures each being aligned on corresponding longitudinal axes defining a second common plane capable of coincident positioning with the common plane of the shaft axes, said first aperture being contoured to receive said first boss therein and having contact points coordinated for abutting juxtaposition with said radially most-distal and most-proximal points on said first guide path when said first boss is fully received in said first aperture and said second aperture being contoured to receive said second boss therein and having contact points coordinated for contemporaneous abutting juxtaposition with said one and another radial points of said second boss, respectively, when said second boss is fully received in said second aperture, distances between corresponding contact points of said first and second apertures being within an elastic limit of the isolator mechanism;

said first guide path including at least one load-interfacing portion parallel to the first axis and said first aperture of said strap including a corresponding at least one load-interfacing portion parallel to said first aperture longitudinal axis; and said first guide path further including at least one non-load-interfacing portion aligned at a corresponding at least one angle to the first axis and said first aperture of said strap further including a corresponding at least one non-load-interfacing portion aligned at said corresponding at least one angle to said first aperture longitudinal axis.

2. A shipping strap assembly according to claim 1:

said first guide path including one said load-interfacing portion extending axially inwardly from one of said radially most-distal point at an axially proximal end thereof and said radially most-proximal point at an axially distal end thereof; and said first aperture of said strap including a corresponding load-interfacing portion parallel to said first aperture longitudinal axis.

3. A shipping strap assembly according to claim 2:

said first guide path including one angled non-load-interfacing portion aligned at an angle to the first axis from said load-interfacing portion to one of said radially most-distal point at an axially proximal end thereof and said radially most-proximal point at an axially distal end thereof; and said first aperture of said strap including a corresponding at least one non-load-interfacing portion aligned at said angle to said first aperture longitudinal axis.

4. A shipping strap assembly according to claim 1, said first guide path including two load-interfacing portions, one extending axially inwardly from one of said radially most-distal point at an axially proximal end thereof and another extending axially inwardly from said radially most-proximal point at an axially distal end thereof and one angled non-load-interfacing portion extending between said two load interfacing portions said first aperture of said strap including a corresponding at least one non-load-interfacing portion angled to said first aperture longitudinal axis and parallel to said at least one non-load-interfacing portion.

5. A shipping strap assembly according to claim 4, said first guide path including one tapered non-load-interfacing portion extending between said two load-interfacing portions.

6. For protecting a vibratory screening machine isolator mechanism against exceeding its elastic limit, the mechanism extending between two shafts thereof, one of the two shafts having a concentric cylindro-conical boss proximate one end thereof, a shipping strap assembly comprising:
　a rigid strap having a cylindro-conical aperture through one end portion thereof and a cylindrical aperture through another end portion thereof, a distance between said apertures being equal to a distance between the two shafts with the isolator mechanism at a normal loaded length, said cylindro-conical aperture being tapered for complemental juxtaposition against the boss on the one of the two shafts and said cylindrical aperture having a diameter sized to provide an annulus around the other of the two shafts; and
　a nut threaded on the one of the two shafts for tightening and loosening said cylindro-conical aperture into and out of complemental juxtaposition against the boss whereby, when said cylindro-conical aperture and the boss are in complemental juxtaposition, a distance between the two shafts is maintained at a normal loaded length of the mechanism.

7. A strap according to claim 6, a taper of said cylindro-conical aperture and a diameter of said cylindrical aperture being coordinated to permit said cylindrical aperture to be disengaged from the other of the shafts without removing said nut from the one of the shafts.

8. A strap according to claim 6, said cylindro-conical boss having a conical mid-portion between leading and trailing end portions.

9. A strap according to claim 6, said cylindro-conical boss having a conical portion trailing a cylindrical portion thereof.

10. A strap according to claim 6, said cylindro-conical boss having a conical portion leading a trailing cylindrical portion thereof.

11. A strap according to claim 6, said nut having a trailing end adapted for tool-free manual turning to cause said nut to travel on the threaded end of the one of the two shafts.

\* \* \* \* \*